United States Patent [19]
Dragos

[11] Patent Number: 5,903,065
[45] Date of Patent: May 11, 1999

[54] POWER FAILURE TRANSFER SWITCHING SYSTEM

[76] Inventor: Theofil Dragos, 1108 Qual Run Dr., Bolingbrook, Ill. 60440

[21] Appl. No.: 09/073,310

[22] Filed: May 4, 1998

[51] Int. Cl.[6] .......................................................... H02J 9/04
[52] U.S. Cl. ................................. 307/64; 307/80; 307/87
[58] Field of Search ................................... 307/64, 80, 85, 307/86, 87, 43, 18, 23, 29, 153, 112, 125, 130

[56] References Cited

U.S. PATENT DOCUMENTS

| | | | |
|---|---|---|---|
| 4,612,495 | 9/1986 | Yamauchi et al. | 322/100 |
| 4,672,277 | 6/1987 | Lagree et al. | 307/64 |
| 5,268,850 | 12/1993 | Skoglund | 364/480 |
| 5,619,077 | 4/1997 | Green et al. | 307/64 |
| 5,642,002 | 6/1997 | Mekanik et al. | 307/64 |
| 5,734,239 | 3/1998 | Turner | 318/142 |

*Primary Examiner*—Jeffrey Gaffin
*Assistant Examiner*—Edwin D. Garlepp
*Attorney, Agent, or Firm*—Goldstein & Canino

[57] ABSTRACT

A power failure transfer switching system to be used with a utility 240 VAC power source connected to a load circuit. The switching system includes an emergency generator, time delay relays, coil contactors, and circuitry necessary for supplying electric power to the load circuit during power outages. During normal operations wherein normal utility power is available, the load circuit derives its power from the utility power source. In the event of a power outage, the load circuit is disconnected from the utility power source via a pair of contacts. The switching system further includes a battery operated control circuit which has a time delay relay adapted to delay the activation of the generator in case the power outage is a momentary glitch. Once the generator activates, another time delay relay connected to the generator terminals delays the electrical connection between the generator and the load circuit until the generator reaches a steady-state condition. When the utility power is reestablished, another time delay relay connected to the terminals of the utility power source delays deactivation of the generator and delays reconnection between the utility power source to the load circuit in case the power restoration is only temporary.

6 Claims, 2 Drawing Sheets

POWER FAILURE TRANSFER SWITCHING SYSTEM

BACKGROUND OF THE INVENTION

The invention relates to a power failure transfer switching system. More particularly, the invention relates to a system for activating an emergency generator, and switching household wiring, to supply power to critical appliances and equipment.

In the early days of electrical distribution, power failures were a frequent occurrence. Until years of operation taught engineers how to build reliable electrical transmission systems, consumers were forced to live with frequent power outages.

A power outage is not only inconvenient, disrupting lights, television, and computers, but can also cause damage and injury. Food spoils because of powerless refrigeration equipment, flooding occurs because of non-operational sump pumps, people are injured when lighting in critical areas is suddenly extinguished.

Today, even after considerable advances have taken place in electrical power generation and transmission, outages still do occur. In certain areas, outages can occur quite frequently—especially in location having overhead power lines and habitual turbulent weather systems.

In areas where frequent power outages occur, much can be done to minimize the impact of a power outage incident. Hospitals and other public buildings often have back-up generator systems. These systems are quite complex and expensive, and thus are unsuitable for residential use.

Some homeowners purchase stand-alone generators to supply power in an emergency. However, these stand-alone generators are inconvenient to use. Because they operate by gasoline combustion, they must be operated outdoors. However, they are not intended for any type of permanent connection. Thus, when an outage occurs, someone must physically run an extension cord from the generator to the appliance. This process is time consuming, and can be quite dangerous—especially since the extension cord is a tripping hazard in an unlit dwelling. Further, one is severely limited in the number of appliances that can be connected to the generator in this manner. For instance, there is no way to quickly connect hard-wired household lighting systems to an emergency generator. Also, the plug for refrigeration equipment is usually inaccessible. It almost always would require moving the refrigeration equipment, in the dark, to unplug the cord and transfer it to an extension cord.

Further, if no one is home during a power outage, the stand-alone emergency generator is useless to prevent food spoilage, flooding, and other problems.

While these units may be suitable for the particular purpose employed, or for general use, they would not be as suitable for the purposes of the present invention as disclosed hereafter.

SUMMARY OF THE INVENTION

It is an object of the invention to produce a power failure transfer and switching system which is capable of supplying power to critical appliances in the event of a power outage.

It is a further object of the invention to provide a power failure transfer and switching system which activates automatically upon a power failure, and deactivates automatically once power has been restored.

It is a still further object of the invention that the system is integrated within the household wiring system, to facilitate automatic direct connection with critical household appliances and equipment when the power fails.

It is a further object of the invention that the system employs a controller which intelligently decides when to activate and deactivate the generator, and when to transfer power connections between the line supply and generator.

It is yet a further object of the invention that the control system delays activation of the generator in case the power outage is a momentary glitch; delays connection of the activated generator until a steady-state condition is reached; and delays reconnection to the power lines once the power is restored in case the power restoration is only temporary.

The invention is a power failure transfer switching system to be used with a utility 240 VAC power source connected to a load circuit. The switching system includes an emergency generator, time delay relays, coil contactors, and circuitry necessary for supplying electric power to the load circuit during power outages. During normal operations wherein normal utility power is available, the load circuit derives its power from the utility power source. In the event of a power outage, the load circuit is disconnected from the utility power source via a pair of contacts. The switching system further includes a battery operated control circuit which has a time delay relay adapted to delay the activation of the generator in case the power outage is a momentary glitch. Once the generator activates, another time delay relay connected to the generator terminals delays the electrical connection between the generator and the load circuit until the generator reaches a steady-state condition. When the utility power is reestablished, another time delay relay connected to the terminals of the utility power source delays deactivation of the generator and delays reconnection between the utility power source to the load circuit in case the power restoration is only temporary.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
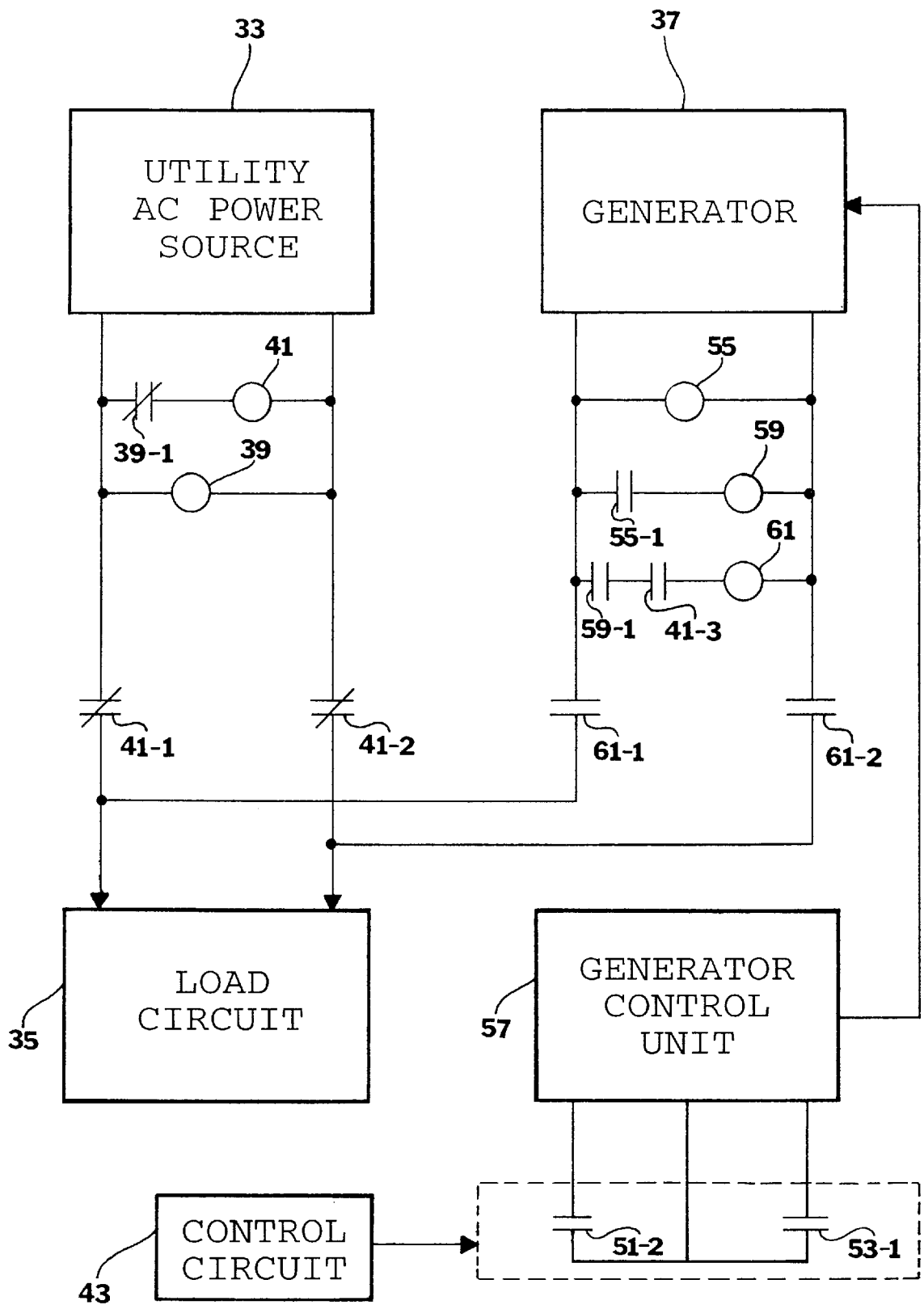
FIG. 1 is a schematic diagram of a preferred embodiment of a power failure transfer switching system in accordance with the principles of the present invention.

FIG. 1 schematically illustrates a power failure transfer switching system in accordance with the principles of the present invention, showing a utility 220 VAC power source 33 supplying electrical power to a critical load circuit 35. As will be seen in following paragraphs, the switching system is designed to automatically disconnect the utility power source 33 from the critical load circuit 35 upon a power outage and subsequently bring an emergency generator 37 online to supply electric power to critical household appliances and equipment during the power outage. Once the utility power returns, the switching system automatically shuts off the generator 37 and disconnects it from the critical load circuit 35. Reestablishment of the utility AC power causes the system to automatically reconnect the critical load circuit 35 to the utility power source 33.

The power failure transfer switching system includes a time delay relay 39 connected to the utility power source terminals. A normally closed contact 39-1 (operated by the time delay relay 39) and a coil contactor 41 are connected in parallel with the relay 39. Normally closed contacts 41-1 and 41-2 (operated by the coil contactor 41) are connected between the critical load circuit 35 and the utility power source 33 to permit electric connection therebetween during normal operations. The time delay relay 39 is utilized to delay reconnection between the load circuit 35 and the utility power source 33 when the utility power is reestablished in case the power restoration is only temporary To illustrate, once the power is restored, the time delay relay 39 is energized to close its contact 39-1 at the end of a first time delay interval. The first time interval is predetermined by the selection of the time delay relay 39 which in this embodiment is of type that provides delay of approximately thirty seconds.

Figure 2:
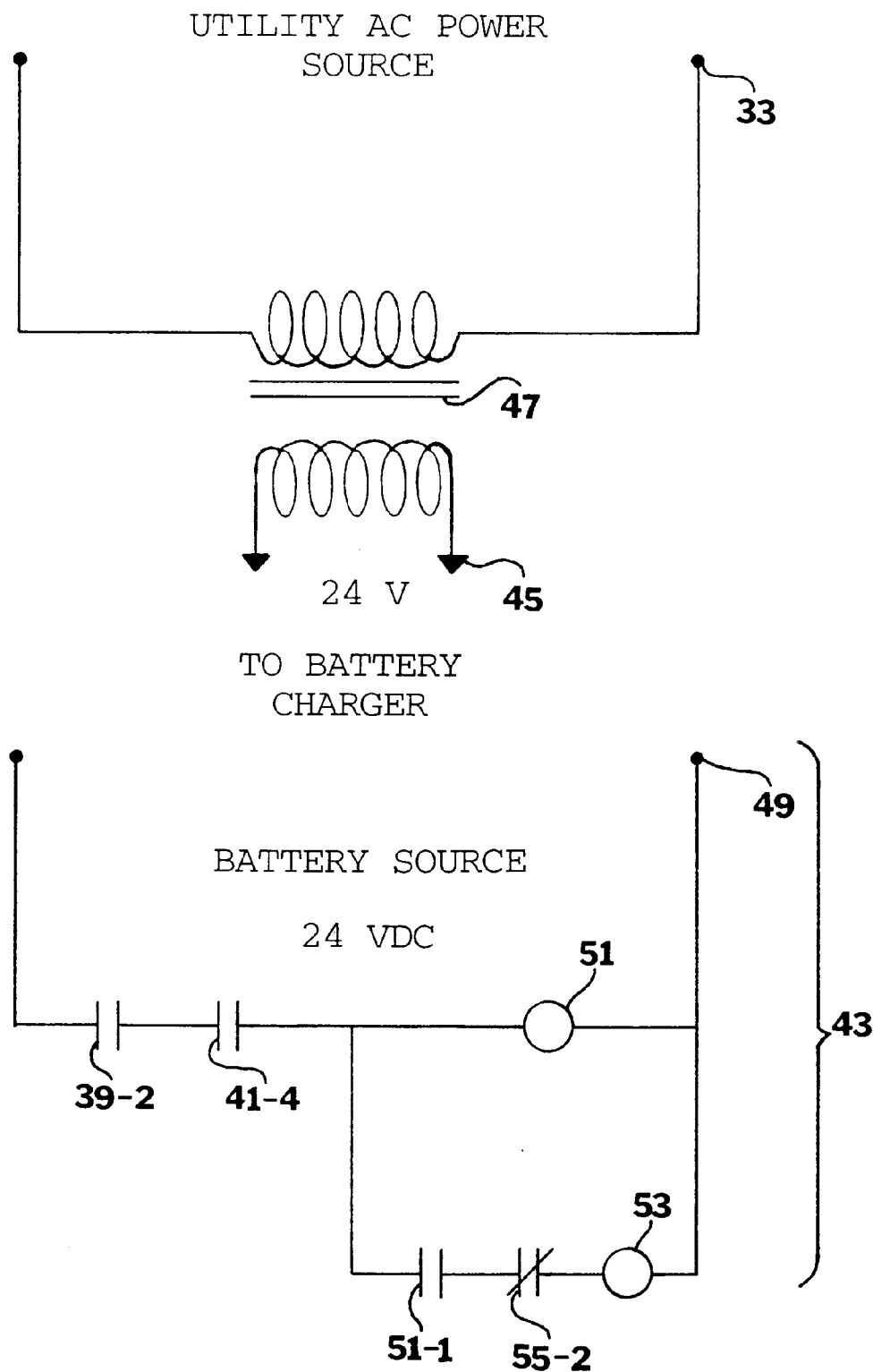
FIG. 2 is a schematic diagram of a control circuit of the power failure transfer switching system.

FIG. 2 schematically illustrates a control circuit 43 of the power failure transfer switching system. A battery charger 45 derives power from the utility power source 33 via a transformer 47 to charge a 24 VDC battery source 49. Although in the preferred embodiment, the switching system utilizes a 24 VDC battery source 49 for supplying electric power to the control circuit 43, it should be noted that any other suitable means for supplying power to the control circuit 43 may be employed as would be appreciated by those skilled in the art. The control circuit 43 includes a normally opened contact 39-2 (operated by the relay 39), a normally opened contact 41-4 (operated by the contactor 41), and a time delay relay 51, connected in parallel with a normally opened relay contact 51-1 (operated by the relay 51), a normally closed contact 55-2 (operated by a contactor 55, yet to be described) and a time delay relay cycle 53. The relay 51 in this embodiment is of type that provides approximately three-minute delay, and the relay 53 is of type that cycles between one-second on and fifteen-seconds off.

FIG. 1 illustrates a generator control unit 57 for starting, stopping, and maintaining operation of the generator 37. Relay contacts 51-2 (operated by the relay 51 of the control circuit) and 53-1 (operated by the relay 53 of the control circuit) are connected to the generator control unit 57 such that closing of the normally open relay contacts 51-2 and 53-1 causes the generator control unit 57 to start the generator 37. On the other hand, when both of the contacts 51-2 and 53-1 is in the opened condition, this causes the generator control unit 57 to stop operation of the generator 37. There might be additional components necessary to start, stop, and maintain operation of the generator 37. These components are well known to persons of ordinary skill in the art.

The switching system further includes electrical components required to establish connection between the generator 37 and the load circuit 35 in response to activation of the generator 37. A coil contactor 55 is connected to the generator terminals, which is connected in parallel with a contact 55-1 (operated by the coil contactor 55) and a time delay relay 59, which in turn is connected in parallel with a relay contact 59-1 (operated by the relay 59), a normally opened contact 41-3 (operated by the coil contactor 41), and a coil contactor 61. Normally opened contacts 61-1 and 61-2 (operated by the contactor 61) are connected between the generator 37 and the load circuit 35 which will automatically close to permit electric connection therebetween at the end of a second time interval after start of the generator 37. The second time interval is predetermined by the selection of the time delay relay 59 which in this embodiment is of type that provides delay of approximately one minute.

The operation of the power failure transfer switching system will now be described. During normal operations, the time delay relay 39 is energized, closing the normally closed contact 39-1. Closure of the contact 39-1 permits power from the utility power source 33 to energize the coil contactor 41, which in turn causes the normally closed contacts 41-1 and 41-2 to close and thereby permit current flow from the utility power source 33 to the critical load circuit 35. Thus, when normal utility power is available, the load circuit 35 derives its power from the utility power source 33 while the generator 37 is off and furnishes no power. In addition, the contacts 61-1 and 61-2 remains open during normal operations to ensure that no current flows from the generator 37 to the load circuit 35.

When a power outage occurs, the coil contactor 41 is deenergized, opening the normally closed contacts 41-1 and 41-2 to disconnect the utility power source 33 from the load circuit 35, and closing the normally opened contacts 41-3 and 41-4. In addition, the relay 39 is deenergized, opening the normally closed contact 39-1 and closing the normally opened contact 39-2. Referring momentarily to the control circuit 43 in FIG. 2, closing of the contacts 41-4 and 39-2 completes the circuit for energizing of the time delay relay 51, which closes its normally opened contacts 51-1 and 51-2 at the end of 51's delay time interval. The relay 51 is designed to delay activation of the generator 37 in case the power outage is a momentary glitch. Closing of the contact 51-1 activates the relay 53 which operates its contact 53-1 to cycle between 1 second on mode and 15 seconds off mode.

Referring now to FIG. 1, closing of the contact 53-1 causes the generator control unit 57 to start the generator 37. Whereupon, the power generated by the generator 37 energizes the coil contactor 55 and thereby opening the normally closed contact 55-2 to disable the relay 53 and closing the normally opened contact 55-1 to activate the time delay relay 59. The time delay set forth by the relay 59 ensures that the activated generator 37 has reached its steady-state condition prior to its connection with the load circuit 35. Upon expiration of the time delay of the relay 59, the contact 59-1 is closed to energize the coil contactor 61, which in turn closes the normally opened contacts 61-1 and 61-2. The closing of the contacts 61-1 and 61-2 allows current flow from the generator to the load circuit 35 and thereby supplying electric power to critical household appliances and equipment to protect against severe damages and losses during prolonged power outages.

When the utility AC power is reestablished, the time delay relay 39 is energized to operate the contacts 39-1 and 39-2 at the end of its time delay interval, closing the contact 39-1 to activate the contactor 41 and opening the contact 39-2 to deenergize the relay 51. In response to the opening of the contact 51-2, the generator control unit 57 terminates operation of the generator 37. The contacts 41-1 and 41-2 are closed to reconnect the load circuit 35 to the utility power source 33 upon the activation of the contactor 41.

While the embodiments of the present invention are disclosed in relation to load circuits that are connected to an utility 220 VAC power source, it will be apparent to those skilled in the art that the power failure transfer switching system disclosed herein may be incorporated into load circuits that derive its power from other power sources. Many specific details contained in the above description merely illustrate some preferred embodiments and should not be construed as a limitation on the scope of the invention. Many other variations are possible.

What is claimed is:

1. A power failure transfer switching system for use with a primary power source supplying power to a load circuit, said load circuit connected to an electric generator, said power failure transfer switching system comprising:
   a) first contact means operable between closed and open conditions for coupling said primary power source to said load circuit;
   b) first actuating means for actuating said first contact means, said first actuating means connected to the primary power source such that upon a power outage said first contact means is opened, and when said primary power is reestablished said first contact means is closed at the end of a first time interval;
   c) second contact means operable between closed and open conditions for coupling said generator to said load circuit;
   d) second actuating means for actuating said second contact means, said second actuating means connected to the generator terminals such that upon activation of the generator said second contact means is closed at the end of a second time interval, and when said primary power is reestablished said second contact means is opened; and
   e) control means responsive to a power outage of said primary power source to start said generator at the end of a third time interval, said control circuit means also responsive to reestablishment of the primary power source to stop said generator at the end of said first time interval.

2. The power failure transfer switching system as recited in claim 1, wherein the first time interval is on the order of 30 seconds, the second time interval is on the order of 60 seconds, and the third time interval is on the order of 3 minutes.

3. A power failure transfer switching system for use with a primary power source supplying power to a load circuit, said load circuit connected to an electric generator, said power failure transfer switching system comprising:
   a) first contact means operable between closed and open conditions for coupling said primary power source to said load circuit;
   b) first coil contactor means for actuating said first contact means, said first coil contactor means connected to said primary power source;
   c) first time delay means for delaying energizing of said first coil contactor means a first predetermine time interval after reestablishment of said primary power source, said first time delay means connected to said first coil contactor means and said primary power source such that upon a power outage said first contact means is opened, and when said primary power is reestablished said first contact means is closed at the end of said first time interval;
   d) second contact means operable between closed and open conditions for coupling said generator to said load circuit;
   e) second coil contactor means for actuating said first contact means, said second coil contactor means connected to said generator;
   f) second time delay means for delaying energizing of said second coil contactor means a second predetermined time interval after activation of said generator, said second time delay means connected to said second coil contactor means and said generator such that upon activation of the generator said second contact means is closed at the end of said second time interval, and when said primary power is reestablished said second contact means is opened; and
   g) control means responsive to a power outage of said primary power source to start said generator at the end of a third time interval, said control circuit means also responsive to reestablishment of the primary power source to stop said generator at the end of said first time interval.

4. The power failure transfer switching system as recited in claim 3, wherein the control means further comprises:
   a) a generator control unit for starting, stopping, and maintaining operation of the generator;
   b) third contact means operable between closed and open conditions, said third contact means connected to said generator control unit such that closing of said third contact means causes said generator control unit to start the generator, and subsequently opening of said third contact means causes said generator control unit to stop the generator; and
   c) a control circuit having a third time delay means for actuating said third contact means the third time interval after the power outage of the primary power source.

5. The power failure transfer switching system as recited in claim 4, wherein the control circuit is operated by a battery source.

6. The power failure transfer switching system as recited in claim 5, wherein the first time interval is on the order of 30 seconds, the second time interval is on the order of 60 seconds, and the third time interval is on the order of 3 minutes.

* * * * *